J. Eiberweiser,
Straw Cutter.

No. 92,946.  Patented July 27, 1869.

attest
William Bauer
Sam. Knight

J. Eiberweiser
Inventor:
By his attys
Knight Bros

United States Patent Office.

JOHN EIBERWEISER, OF CINCINNATI, OHIO, ASSIGNOR TO HIMSELF AND FREDERICK GROENE, OF SAME PLACE.

Letters Patent No. 92,946, dated July 27, 1869.

IMPROVEMENT IN FODDER-CUTTER.

The Schedule referred to in these Letters Patent and making part of the same.

*To whom it may concern:*

Be it known that I, JOHN EIBERWEISER, of Cincinnati, Hamilton county, Ohio, have invented a new and useful Fodder-Cutter, of which the following is a full, clear, and particular description, reference being had to the accompanying drawings, making a part of this specification.

A is a frame, supporting the operative mechanism.

The feed-trough B inclines slightly upward to said frame, to which it is suitably attached, and has its floor covered with an apron, O, stretched around two rollers, D E, of which one, D, is the driver, and the other one, E, is journalled in slotted and adjustable lugs E', of which one is shown.

These lugs are secured to the sides of the trough by screws e, and adjusted by screws e'.

Suspended by arms F F', in front of the throat G, is a knife, H, having wrists h, which occupy eyes 1 in bolts 2, which pass horizontally through the free ends of the arms, so as to turn easily therein.

Figure 1:
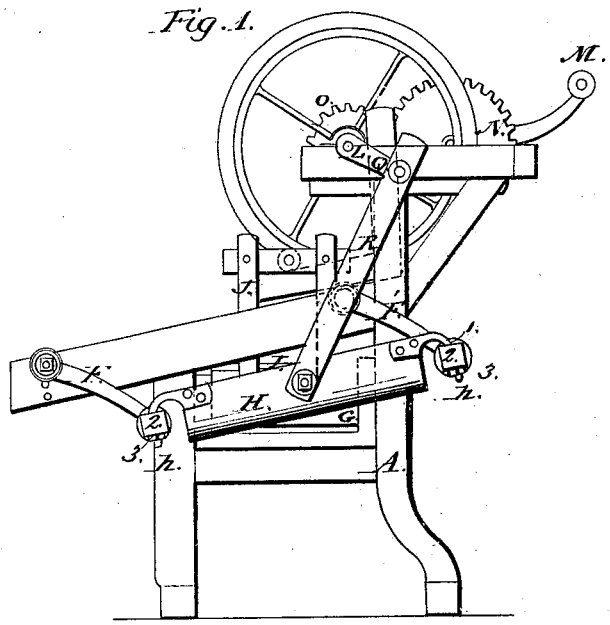
Figure 1 is a rear elevation of my fodder-cutter.
Figure 2:
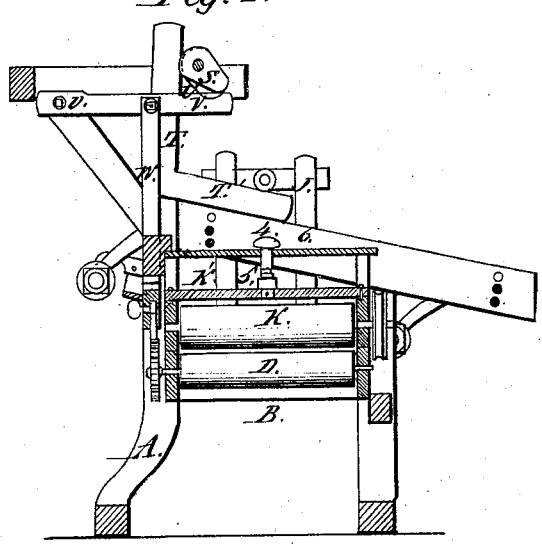
Figure 2 is a section at the line x–x, looking in direction of the feed.
Figure 3:
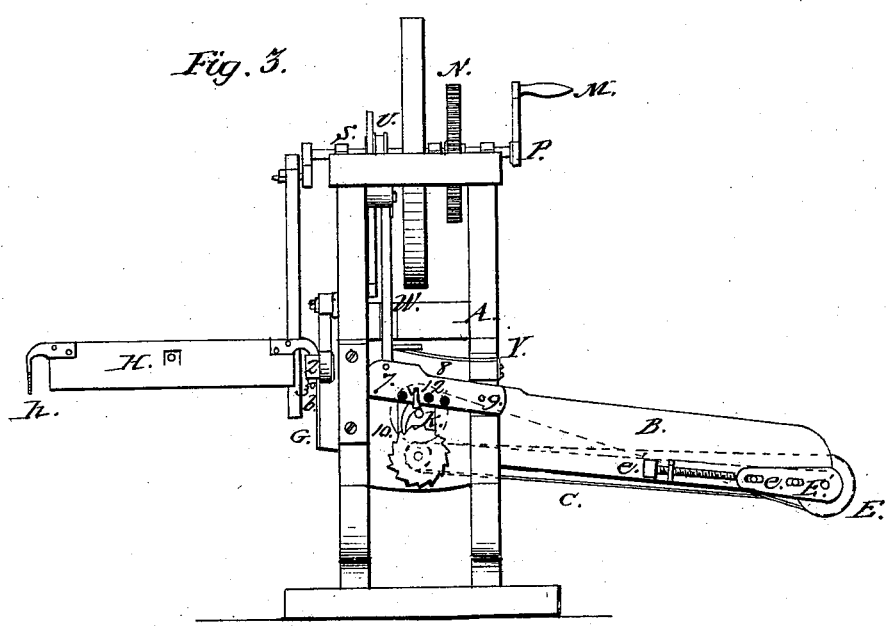
Figure 3 is a side elevation of the machine, one end of the knife being disengaged, for the purpose of sharpening.

These wrists are secured to their places by nuts 3, either of which, being unscrewed, permits the disengagement of that end, as in fig. 3, so as to enable the knife to be whetted.

I is a pressure-board, which, except when temporarily lifted, as hereafter explained, is pressed downward upon the fodder by its weighted frame J.

K is a feed and pressure-roller, operated by a cross-belt from the roller E, and held down upon the fodder by a casting, K', which rests upon the movable boxes k of said feed-roller K.

4 is a handle, which extends upward from the casting K', to enable the elevation of the same; and said handle has in it a notch, 5, to receive a button, 6, for holding the roller K clear of the fodder, when so desired.

P is a driving-shaft, journalled horizontally in the top of the frame, and having a winch, M, and a spur-wheel, N, which gears with a pinion, O, upon the counter-shaft L, which shaft terminates in a crank, Q, connected by pitman R to the knife, about the mid-length of the latter.

A cam, S, upon the counter-shaft, acts on the long arm of a bent lever, T T', whose short arm is thus, at the proper moment, caused to lift the pressure-board I.

Another cam, U, on the same shaft, acts on an arm, V, hinged at v, to the frame, and having pivoted to it a feed-hand, W, whose lower extremity is pivoted, 7, to an arm, 8, hinged to the frame at 9, and having a pawl or feed-hand, 10, by which the ratchet x of the lower feed-roller D is operated.

By shifting the pawl 10 forward or backward in the series of holes 12, the movement of the feed-roller may be varied as desired.

A spring, Y, serves to elevate the above-described ratchet-moving mechanism, V, W, 7, 8, 9, 10, whenever relieved from the action of the cam U.

I claim herein as new, and of my invention—

1. The described construction and arrangement of knife H, whose wrists h occupy eyes 1 in bolts 2, which pass horizontally through the free ends of the vibrating arms F F', in the manner set forth.

2. The described arrangement of adjustable apron and weighted pressure-roller, whose operating-handle is provided with a notch and button, as and for the purpose explained.

In testimony of which invention, I hereunto set my hand.

JOHN EIBERWEISER.

Witnesses:
GEO. H. KNIGHT,
JAMES H. LAYMAN.